May 10, 1927.
H. CATLETT
1,628,030
ROLLER ARM REST
Filed April 20, 1926
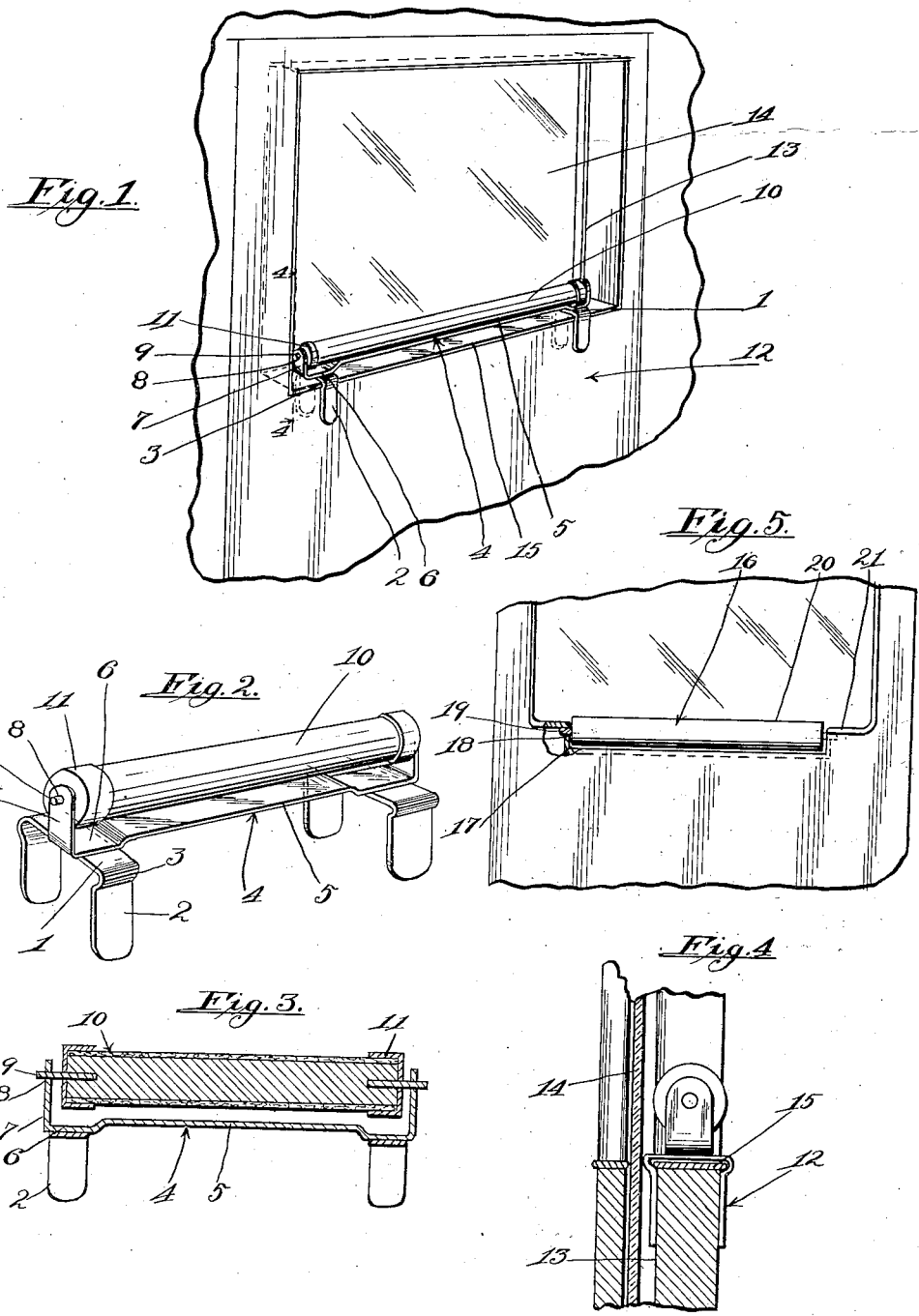
Inventor
Harry Catlett
by Hazard and Miller
Attorneys Patented May 10, 1927.

1,628,030

UNITED STATES PATENT OFFICE.

HARRY CATLETT, OF LOS ANGELES, CALIFORNIA, ASSIGNOR OF ONE-HALF TO ALBERT N. SACRE, OF LOS ANGELES, CALIFORNIA.

ROLLER ARM REST.

Application filed April 20, 1926. Serial No. 103,251.

My invention is a roller arm rest adapted for automobiles to enable the driver to rest one arm on the arm rest so that he may readily signal his traffic movements with the arm.

An object of my invention is the provision of a roller arm rest adapted to be detachably connected to or built in an automobile so that the driver may readily move an arm over such rest, the rest rotating and hence preventing wearing out of his coat sleeve.

In this country automobiles are usually driven by left side drive and the left arm is utilized for signalling. The constant rubbing of the sleeve over the side of the vehicle or through the window of a closed car wears out the sleeve. An object of my invention therefore is to provide a simple roller device so that when the arm is thrust outwardly it will roll on the roller, preventing excessive wear on the sleeve.

In constructing my invention I utilize a pair of brackets which may be slipped over a door of an open or closed car and having a roller mounted on such brackets, the roller being in such position that the left or signalling arm may rest thereon. My construction provides for the brackets fitting over the front door of an open car or fitting on the door or other closure of a closed car inside of the glass.

Another feature of my invention is incorporating the roller in the construction of the vehicle and having it permanently installed therein, preferably with the upper side slightly above the side of an open car or the sill or window of a closed car.

My invention will be more readily understood from the following description and drawings, in which:

Figure 1 is a perspective inside view of a left front door of a closed car with my roller arm rest installed;

Fig. 2 is a perspective view of the roller arm rest detached from the door;

Fig. 3 is a longitudinal section through the roller and supporting structure;

Fig. 4 is a transverse section through a door structure, such as shown in Fig. 1, being taken substantially on the line 4—4;

Fig. 5 is an alternative construction showing my roller permanently mounted in a door or the like.

Referring first to the construction of Figs. 2 and 3, a pair of brackets 1 having depending arms 2 with a bowed spring section 3, are adapted to grip over a door or the side of a car as hereunder set forth. A supporting frame designated generally by the numeral 4 has a band 5 extending between the brackets, the band being secured to the brackets at their crossing position as indicated by the numeral 6. Upstanding ears 7 have journal openings 8 therein, in which are journaled the pins 9 secured to the rollers 10. These rollers are preferably covered with suitable soft material or with leather and have ferrules 11 at each end.

The manner of installing the above described device is illustrated particularly in Figs. 1 and 4, in which the door structure is designated generally by the numeral 12, having a slot 13 in which the glass pane 14 is slidable and also having a finished rim 15.

It will be noted that the brackets fit over the rim and that the arms 2 extend downwardly in the slot 13 and on the inside of the vehicle. The construction allows the glass to slide freely up and down in the slot without interference by the roller or its supporting mounting. For use with open cars the brackets 1 would be designed to fit over the upper edge of the car body or front door, fitting over the outside and inside and thus holding the roller in proper adjusted position.

In the construction of Fig. 5, the roller 16 is mounted in a recess 17 formed in the door structure. This recess has sockets 18 in which the pins 19 of the roller are journaled. The roller may be covered with any suitable material and is intended to have its upper portion 20 project slightly above the sill 21 of a door of a closed car, or slightly above the top edge or rim of an open car.

It will thus be seen that my roller arm rest may be adapted as a detachable device or a permanent installation in vehicles and will rotate easily by the movement of a person's arm in extending same to give the conventional traffic signals or in ordinarily resting the arm on said rest and thereby prevent excessive wear on the coat sleeve.

Although my invention is of a simple character, it will nevertheless be apparent that it may be considerably changed in general construction and in specific details without departing from the spirit thereof as set forth in the description, drawings and claims.

Having described my invention, what I claim is:

1. An arm rest comprising in combination a pair of brackets having depending arms adapted to engage wall surfaces of a vehicle, the top of the bracket being adapted to be supported on a horizontal surface, a band secured to the brackets and having upturned ears, and a roller journaled in said ears.

2. An arm rest comprising a plurality of brackets having depending arms adapted to extend inside a vehicle, the top of the brackets being adapted to rest on a horizontal surface, an ear projecting upwardly and having means to connect same to each bracket, and a roller journaled in the ears to allow rotation.

3. An arm rest comprising a pair of brackets having depending arms with a bowed spring section, the arms being adapted to extend on the inside and outside portion of a vehicle and the upper part of the brackets being adapted to rest on a horizontal rim, a band secured to the brackets, the band having upturned ears, and a roller having pins, the pins being journaled in the said ears to allow rotation of the roller.

In testimony, whereof I have signed my name to this specification.

HARRY CATLETT.